(12) United States Patent
Ni et al.

(10) Patent No.: US 7,431,538 B1
(45) Date of Patent: Oct. 7, 2008

(54) END MILL FOR ORBITAL DRILLING OF FIBER REINFORCED PLASTIC MATERIALS

(75) Inventors: Wangyang Ni, Latrobe, PA (US); Jason W. Chandler, Rogers, AR (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/786,562

(22) Filed: Apr. 12, 2007

(51) Int. Cl.
*B23B 5/10* (2006.01)

(52) U.S. Cl. .......................... 407/53; 407/54

(58) Field of Classification Search ............... 407/53, 407/54, 61, 63, 30, 34; 408/230, 227; *B23B 5/10*
See application file for complete search history.

(56) References Cited

U.S. PATENT DOCUMENTS

| | | | |
|---|---|---|---|
| 4,341,044 A * | 7/1982 | Cross | 451/72 |
| 4,564,321 A | 1/1986 | Kondo et al. | |
| 5,322,394 A * | 6/1994 | Okanishi et al. | 407/32 |
| 5,709,907 A * | 1/1998 | Battaglia et al. | 427/126.1 |
| 6,179,528 B1 * | 1/2001 | Wardell | 407/54 |
| 6,997,651 B2 * | 2/2006 | Kawai et al. | 407/53 |
| 7,001,113 B2 * | 2/2006 | Flynn et al. | 407/54 |
| 7,014,394 B2 | 3/2006 | Inglis | |
| 2002/0141833 A1 * | 10/2002 | MacArthur | 407/53 |
| 2003/0053870 A1 * | 3/2003 | Flynn et al. | 407/30 |
| 2004/0115434 A1 * | 6/2004 | Okamura et al. | 428/408 |
| 2005/0117982 A1 * | 6/2005 | Dov et al. | 408/24 |

FOREIGN PATENT DOCUMENTS

| | | | |
|---|---|---|---|
| JP | 09309020 A | * | 12/1997 |
| JP | 10225812 A | * | 8/1998 |
| WO | WO 2006/103649 A2 | | 10/2006 |

OTHER PUBLICATIONS

Eric Whinnem, "Development and Deployment of Orbital Drilling at Boeing", SAE Manufacturing and Automated Fastening Conference and Exhibition, 2006.

Richard Lindqvist and Henrik Kihlman, "Orbital Drilling—Implementation and Evaluation", SAE Manufacturing and Automated Fastening Conference and Exhibition, 2004.

(Continued)

*Primary Examiner*—Boyer D. Ashley
*Assistant Examiner*—Sara Addisu
(74) *Attorney, Agent, or Firm*—Larry R. Meenan

(57) ABSTRACT

A center or non-center cutting end mill for orbital drilling of fiber reinforced plastic (FRP) materials includes a shank, a neck, a cutting head and two or more flutes. The end mill has a tool geometry with the following features: a dish angle between about 2 degrees to about 6 degrees; a helix angle between about 5 degrees to about 18 degrees; an end teeth radial rake angle between about 0 degrees and about 15 degrees; a peripheral teeth radial rake angle between about 8 degrees and about 16 degrees; a gashing axial rake angle between about 3 degrees to about 10 degrees; and a primary clearance angle between about 10 degrees to about 18 degrees. The end mill is made from a tungsten carbide substrate with cemented cobalt in a range between about 3 to 10 wt. % and a diamond coating having a thickness in a range between about 8 to 20 μm.

12 Claims, 6 Drawing Sheets

OTHER PUBLICATIONS

Henrik Kihlman, Ingvar Eriksson, and Mark Ennis, "Robotic Orbital Drilling of Structures for Aerospace Applications", SAE Manufacturing and Automated Fastening Conference and Exhibition, 2002.

H.-K. Tonshoff, P. Andrae and C. Lapp, "High-efficiency Machining of Aerospace-alloys", SAE Manufacturing and Automated Fastening Conference and Exhibition, 1999.

Frederick Latger, Tom Harris, and Stephan Bjorklund, "Drilling Cost Model", SAE Manufacturing and Automated Fastening Conference and Exhibition, 2002.

R. Teti, "Machining of Composite Materials", Annals of CIRP, vol. 51/2, 611-634, 2002.

Ravishankar Iyer, "Helical Milling: An Enabling Technology for Machining Holes in Fully Hardened AISI D2 Tool Steel", Thesis, McMaster University, 2006.

Richard Lindqvist, Ingvar Eriksson, and Mathias Wolf, "Orbital Drilling of Sandwich Constructions for Space Applications", SAE Manufacturing and Automated Fastening Conference and Exhibition, 2001.

Hiroyuki Sasahara, Makoto Kawasaki, and Masaomi Tsutsum, "Helical Feed Milling with MQL for Boring of Aluminum Alloy", No. 02-1213, 6 pages, 2003.

H.K. Tonshoff, T. Friemuth, and M. Groppe, "High Efficiency Circular Milling—A solution for an Economical Machining of Bore Holes in Composite Materials", Third International Conference on Metal Cutting and High Speed Machining, 2001.

H. K. Tonshoff, T. Friemuth, P. Andrae, and M. Groppe, "Circular Milling Replacing Drilling and Reaming", International Seminar on Improving Machine Tool Performance, 2000.

Bert P. Erdel, "Breakthrough Machining Technology for the Automative Industry", International Congress & Exposition, 1996.

P. Rahme, Y. Landon, P. Lagarrigue, R. Piquet, F. Lachaud, B. Marguet, J. Bourriquet and C. Le Roy, "Drilling of Thick Composite Structures State of the Art", SAE International, 2006.

\* cited by examiner

END MILL FOR ORBITAL DRILLING OF FIBER REINFORCED PLASTIC MATERIALS

BACKGROUND OF THE INVENTION

Fiber reinforced plastic (FRP) materials are widely used in aerospace industry due to its high specific strength and high specific stiffness. FRP materials are composite materials consisting of soft resin matrix and high strength fiber reinforcement. Typical fiber reinforcements include carbon fibers (CFRP), glass fibers (GFRP), Kevlar fibers, and the like. FRP materials are often processed into a laminated structure. FRP materials have excellent in-plane strength, but low inter-laminar strength. Fibers tend to delaminate during machining. FIG. 10 shows the fiber delamination around a machined hole using a conventional end mill.

One approach to reduce the fiber delamination is to use an orbital drilling process. Orbital drilling is a holemaking operation by milling in which the center of an end mill orbits about the center of the intended hole while spinning on its own axis and moving in the axial direction. Orbital drilling is also called as circular milling or helical interpolation.

Thus, there is a need to provide a cutting tool that minimizes fiber delamination when machining fiber reinforced plastic materials.

BRIEF SUMMARY OF THE INVENTION

Briefly, according to this invention, there is provided an end mill for orbital drilling of fiber reinforced plastics comprising a shank having a shank diameter; a neck having a neck diameter; and a cutting head having a cutting diameter, a corner radius, a dish angle and a back radius, wherein the neck diameter is about 65 percent to about 90 percent of the cutting diameter, the dish angle is between about 2 degrees to about 6 degrees, and the corner radius is between about 3 percent to about 8 percent of the cutting diameter.

In another embodiment, an end mill for orbital drilling of fiber reinforced plastics has a dish angle between about 2 degrees and about 6 degrees; a helix angle of between about 5 degrees and about 18 degrees; a radial rake angle between about 5 degrees and about 15 degrees; a gashing axial rake angle between about 3 degrees and about 10 degrees; and a primary clearance angle between about 10 degrees and about 18 degrees.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Tool Geometry

Figure 1:
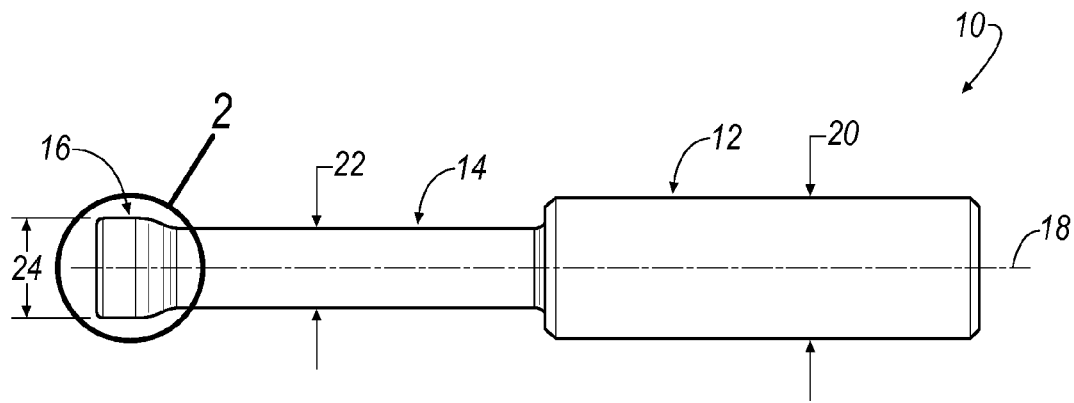
FIG. 1 is a side view of the geometry of an end mill for machining fiber reinforced plastics according to an embodiment of the invention.
Figure 2:
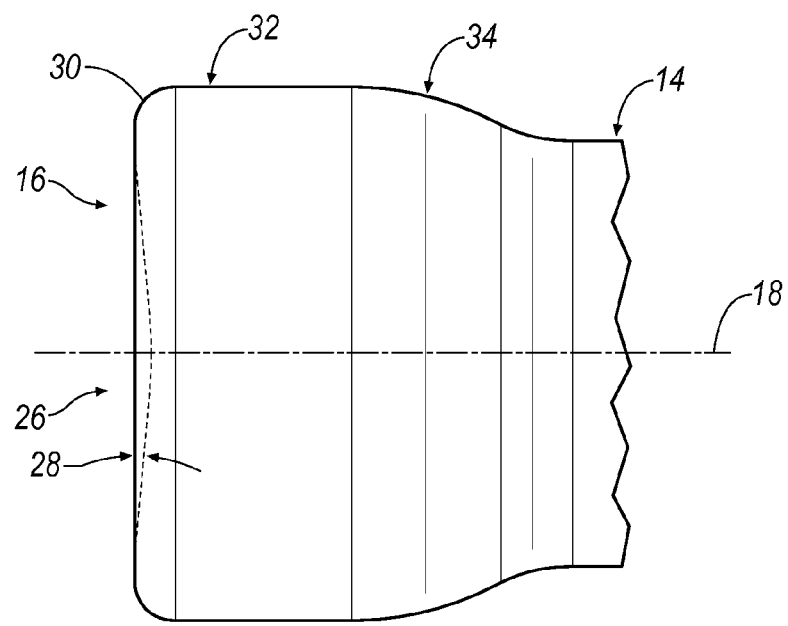
FIG. 2 is an enlarged side view of the cutting head of the end mill of FIG. 1.

Referring to FIGS. 1 and 2, wherein like reference characters represent like elements, an end mill for orbital drilling of fiber reinforced plastics is generally shown at 10. In general, the end mill 10 includes has a shank 12, a neck 14, a cutting head 16, and a longitudinal axis 18. In one embodiment, the shank 12 has a shank diameter 20 of approximately 0.40 inches (10.16 mm), the neck 14 has a neck diameter 22 of approximately 0.22 inches (5.59 mm), and the cutting head 16 has a cutting diameter 24 of approximately 0.28 inches (7.11 mm). In general, the neck diameter 22 is less than the cutting diameter 24, for example, the neck diameter 22 can be approximately 65 to 90 percent of the cutting diameter 24.

As best seen in FIG. 2, the cutting head 16 includes a forward cutting end 26 that includes a dish angle 28 with respect to the end face. In one embodiment, the dish angle 28 can range from about 2 degrees to about 6 degrees. The cutting head 16 also includes a corner radius 30 that is about 3 to about 8 percent of the cutting diameter 24. The corner radius 30 depends on the cutting diameter 24. For example, in one embodiment, the corner radius 30 is about 0.02 inches (0.51 mm) for a cutting diameter 24 of approximately 0.28 inches (7.11 mm). The cutting head 16 also includes a flat 32 that extends from the corner radius 30 to a back radius 34, which causes reduction in diameter from the cutting head 16 to the neck 14. In one embodiment, the back radius 34 is about 0.16 inches (4.06 mm) for a cutting diameter of approximately 0.28 inches (7.11 mm) and a neck diameter 22 of approximately 0.22 inches (5.59 mm).

Tool Configurations

In general, the end mill has a dish angle between about 2 degrees to about 6 degrees, a helix angle between about 5 degrees to about 18 degrees, an end teeth radial rake angle between about 0 degrees to about 15 degrees, a peripheral teeth radial rake angle between about 8 degrees to about 16 degrees; a gashing axial rake angle between about 3 degrees to about 10 degrees, and a primary clearance angle between about 10 degrees to about 18 degrees.

The principles of the tool geometry described above can be applied to various cutting tool configurations. To this end, a number of different tool configurations of the end mill 10 were tested and compared using the principles of the tool geometry described above.

Figure 3:
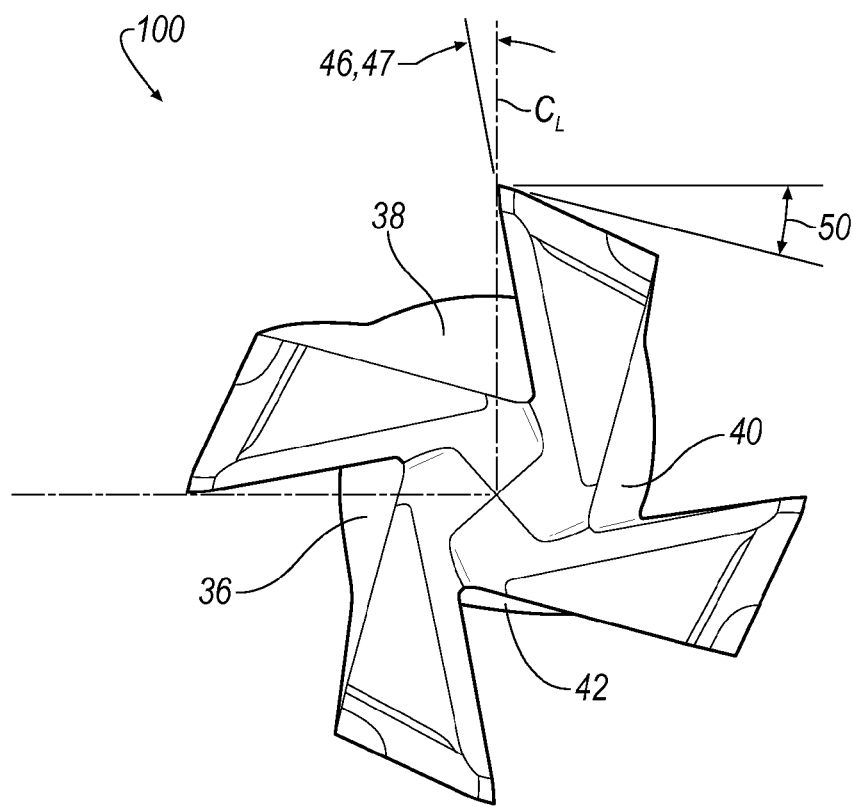
FIG. 3 is an end view of a 4-fluted, non-center cutting end mill for machining fiber reinforced plastics according to an embodiment of the invention.
Figure 4:
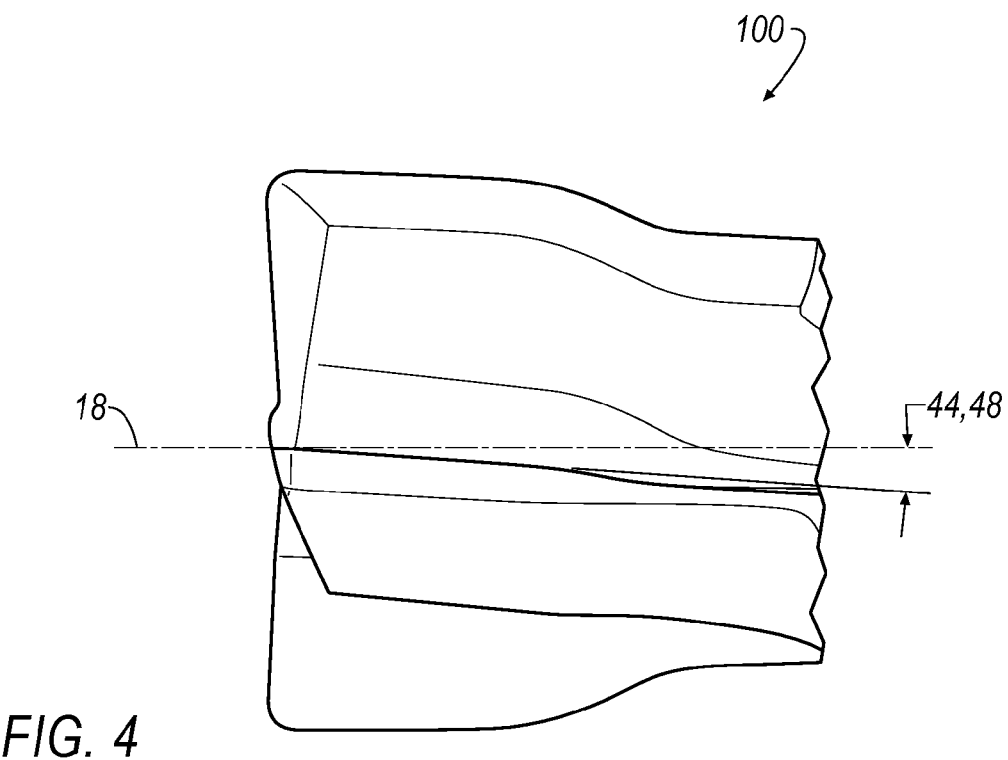
FIG. 4 is a partial side view of the 4-fluted, non-center cutting end mill of FIG. 3.

In one example shown in FIGS. 3 and 4, the principles of the tool geometry were applied to a non-center cutting end mill 100 that includes four flutes, 36, 38, 40, 42, at a helix angle 44 that is about 10 degrees with respect to the longitudinal axis 18. In addition, the end mill 10 includes, but is not limited to, a dish angle 28 of about 4 degrees, an end teeth radial rake angle 46 of about 10 degrees, a peripheral teeth radial rake angle 47 of about 10 degrees, a gashing axial rake angle 48 of about 5 degrees, and a primary clearance angle 50 of about 12 degrees. It is noted that the end teeth radial rake angle 46 is approximately equal to the peripheral teeth radial rake angle 47.

Figure 5:
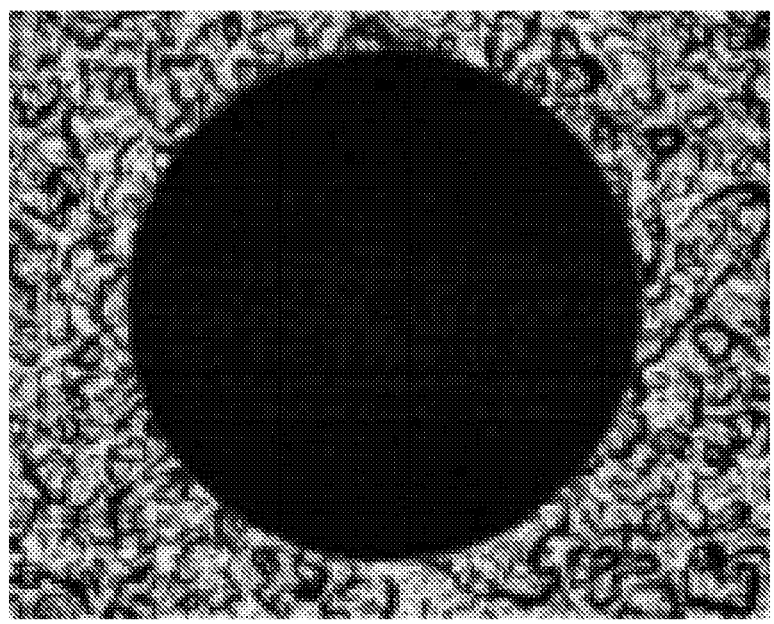
FIG. 5 is a photograph of the hole quality produced by the 4-fluted, non-center cutting end mill of FIG. 3.

As shown in FIG. 5, excellent hole quality is achieved using the end mill and no fiber delamination was observed.

Figure 6:
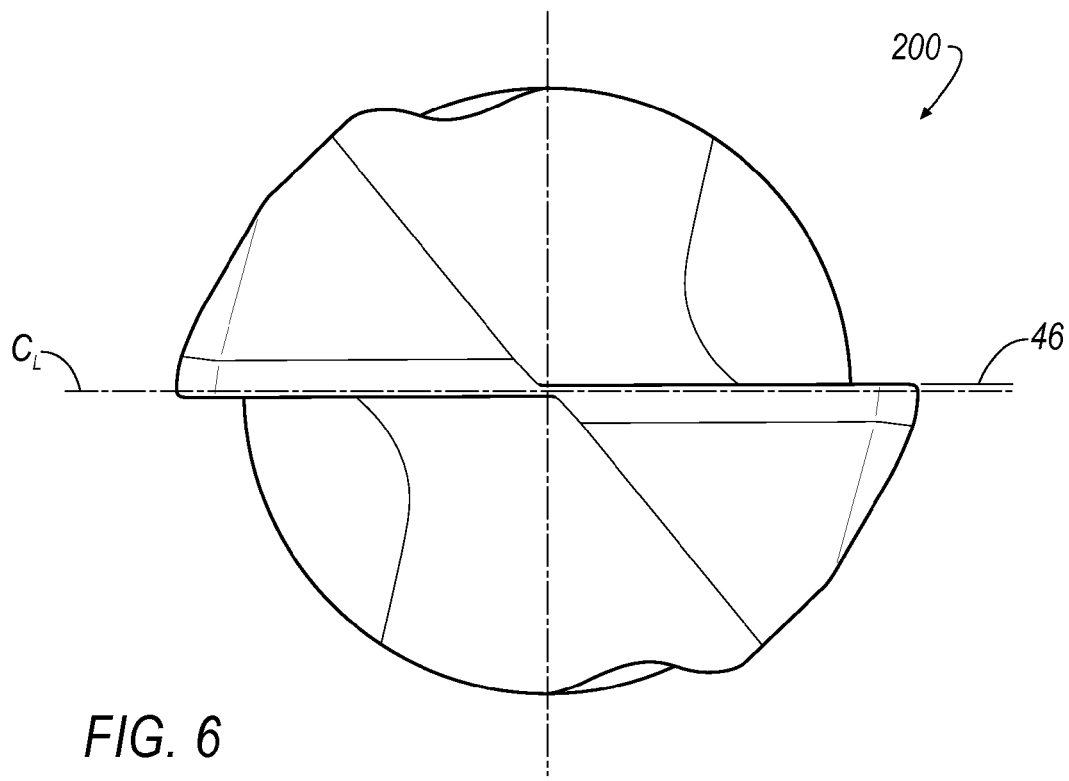
FIG. 6 is an end view of a 2-fluted, center cutting end mill for machining fiber reinforced plastics according to an embodiment of the invention.
Figure 7A:
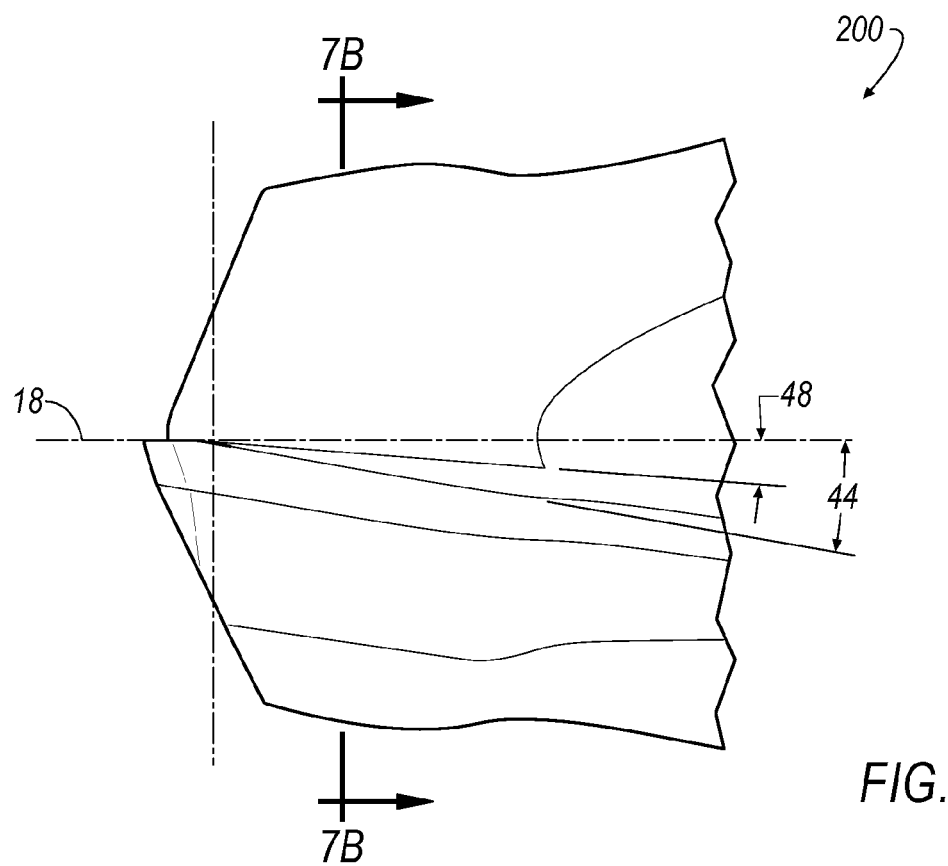
FIG. 7A is a partial side view of the 2-fluted, center cutting end mill of FIG. 6.
Figure 7B:
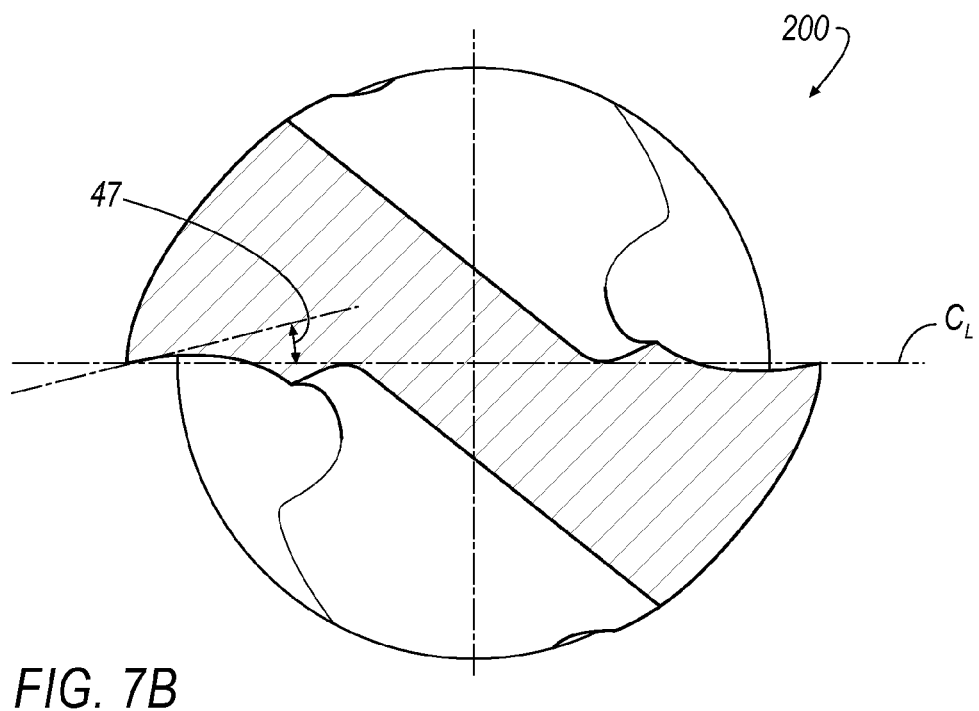
FIG. 7B is a partial cross-sectional end view of the 2-fluted, center cutting end mill taken along line 7B-7B of FIG. 7A.

In another example shown in FIGS. 6, 7A and 7B, the principles of the tool geometry were applied to a 2-flute center cutting end mill 200 that include two flutes at a helix angle 44 of about 10 degrees, a dish angle of about 4 degrees, an end teeth radial rake angle 46 of about 0 degrees, a peripheral teeth radial rake angle 47 of about 10 degrees, a gashing axial rake angle 48 of about 5 degrees, and a primary clearance angle of about 12 degrees. It is noted that the end teeth radial rake angle 46 is less than or equal to the peripheral teeth radial rake angle 47 due to gashing.

Figure 8:
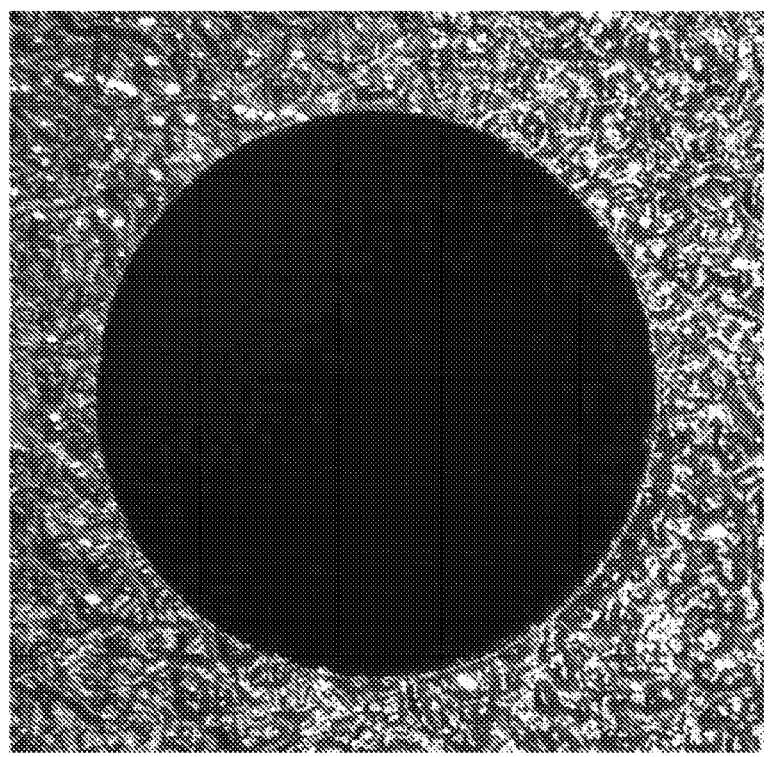
FIG. 8 is a photograph of the hole quality produced by the 2-fluted, center cutting end mill of FIG. 6.
Figure 9:
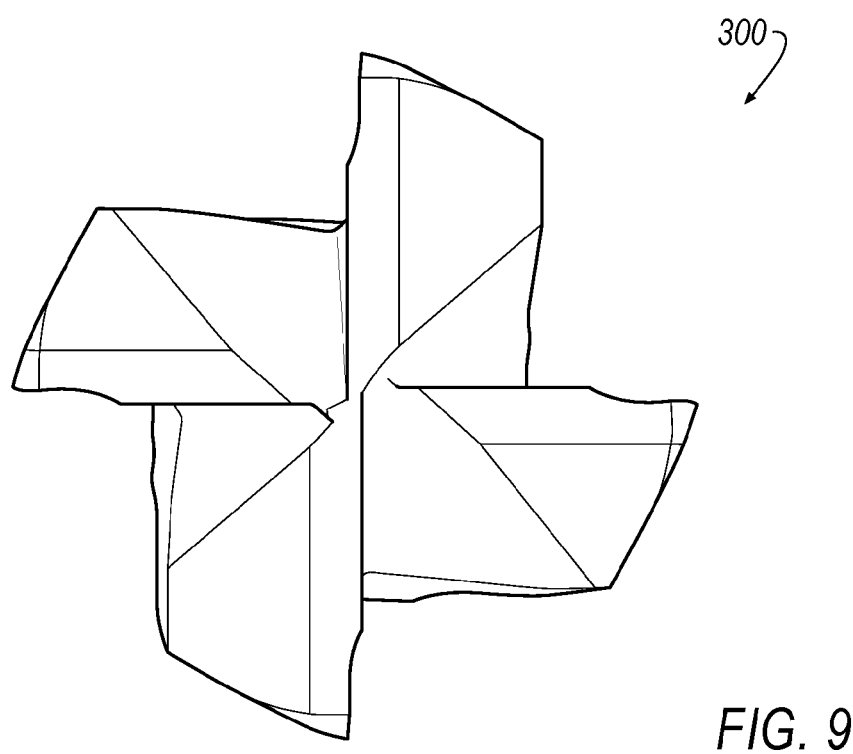
FIG. 9 is an end view of a 4-fluted, center end mill for machining fiber reinforced plastics according to an embodiment of the invention.
Figure 10:
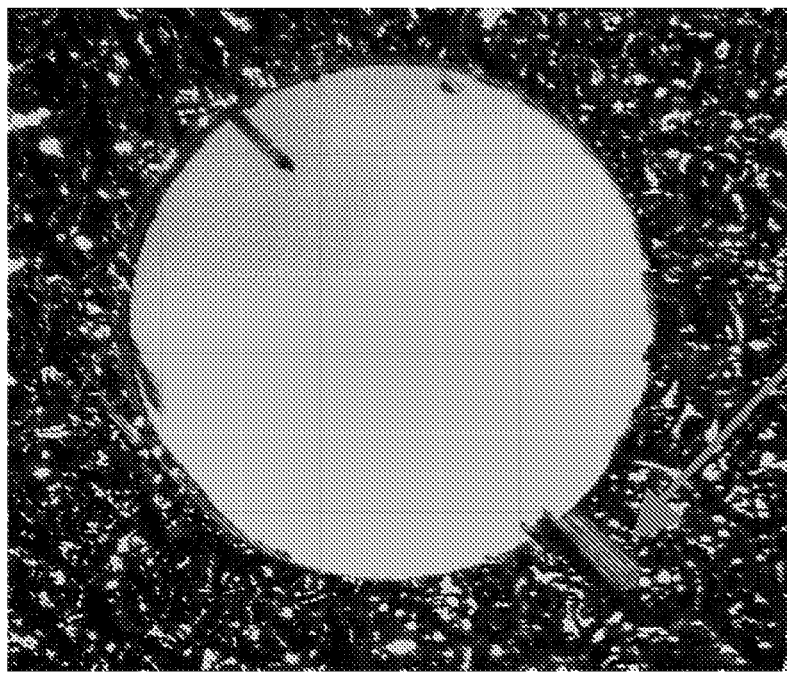
FIG. 10 shows the fiber delamination around a machined hole using a conventional end mill.

As shown in FIG. 8, excellent hole quality is achieved using the end mill and no fiber delamination was observed In yet another example, the same tool geometry for the 2-flute center cutting end mill was applied to a 4-flute center-cutting end mill 300 shown in FIG. 9. Test results indicate that the end mill produced excellent hole quality and no fiber delamination was observed.

Diamond Coating

The fiber reinforcement used in FRP materials is very abrasive and can cause very short life in an uncoated carbide tool. To improve tool life, a diamond coating of about 12 μm thick is applied to the above mentioned end mills. In one embodiment, the end mill 10 is made from a tungsten carbide (WC) substrate with cemented cobalt (Co) in a range between about 3 to 10 wt. % and a diamond coating having a thickness in a range between about 8 to 20 μm deposited by using a chemical vapor deposition (CVD) process. Testing shows that tool life can be increased by 20 times using the diamond coating. The end mill 10 can also be made of a polycrystalline diamond (PCD) material.

It will be appreciated that the principles of the tool geometry can be applied to both non-center cutting and center cutting end mills for orbital drilling of FRP materials.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. An end mill for orbital drilling of fiber reinforced plastics comprising a shank having a shank diameter; a neck having a neck diameter; and a cutting head having a cutting diameter, a corner radius, a dish angle and a back radius, wherein the neck diameter is about 65 percent to about 90 percent of the cutting diameter, the dish angle is between about 2 degrees to about 6 degrees, and the corner radius is between about 3 percent to about 8 percent of the cutting diameter.

2. The end mill according to claim 1, further comprising a plurality of flutes at a helix angle of between about 5 degrees and about 18 degrees.

3. The end mill according to claim 1, further comprising an end teeth radial rake angle between about 0 degrees and about 15 degrees, and a peripheral teeth radial rake angle between about 8 degrees and about 16 degrees.

4. The end mill according to claim 1, further comprising a gashing axial rake angle between about 3 degrees and about 10 degrees.

5. The end mill according to claim 1, further comprising a primary clearance angle between about 10 degrees and about 18 degrees.

6. The end mill according to claim 1, wherein the end mill is made of a substrate comprised of tungsten carbide cemented with cobalt in a range between about 3 wt. % to about 10 wt. %.

7. The end mill according to claim 6, wherein the end mill further includes a diamond coating having a thickness between about 8 μm and about 20 μm.

8. The end mill according to claim 1, wherein the end mill is made of a polycrystalline diamond (PCD) material.

9. An end mill for orbital drilling of fiber reinforced plastics having a dish angle between about 2 degrees and about 6 degrees; a plurality of flutes at a helix angle of between about 5 degrees and about 18 degrees; an end teeth radial rake angle between about 0 degrees and about 15 degrees; a peripheral teeth radial rake angle between about 8 degrees and about 16 degrees; a gashing axial rake angle between about 3 degrees and about 10 degrees; and a primary clearance angle between about 10 degrees and about 18 degrees.

10. The end mill according to claim 9, wherein the end mill is made of a substrate comprised of tungsten carbide cemented with cobalt in a range between about 3 wt. % to about 10 wt. %.

11. The end mill according to claim 10, wherein the end mill further includes a diamond coating having a thickness between about 8 μm and about 20 μm.

12. The end mill according to claim 9, wherein the end mill is made of a polycrystalline diamond (PCD) material.

\* \* \* \* \*